BEST AVAILABLE COPY

N. EARL.

Mode of Hanging and Fastening Doors.

No. 9,679. Reissued April 19, 1881.

WITNESSES:

E. Bendixon

Wm. E. Raymond

INVENTOR:

Charles N. Earl

Jas. Shell, Laass & Hey his Attorneys

N. PETERS, PHOTO-LITHOGRAPHER, WASHINGTON, D. C.

UNITED STATES PATENT OFFICE.

CHARLES N. EARL, OF LOS ANGELES, CALIFORNIA, ASSIGNOR, BY MESNE ASSIGNMENTS, TO WILLIAM H. SAMSON AND ALBERT L. SWETT, BOTH OF MEDINA, NEW YORK.

MODE OF HANGING AND FASTENING DOORS.

SPECIFICATION forming part of Reissued Letters Patent No. 9,679, dated April 19, 1881.

Original No. 88,857, dated April 13, 1869; Reissue No. 9,533, dated January 11, 1881. Application for reissue filed February 12, 1881.

*To all whom it may concern:*

Be it known that I, CHARLES N. EARL, of Los Angeles, in the county of Los Angeles and State of California, have invented a new and Improved Mode of Hanging and Fastening Doors; and I do hereby declare that the following is a full, clear, and exact description of the same.

My invention is an improvement in the class of doors which are adapted to slide horizontally and are suspended by hangers having rollers that run on a supporting-rail secured above the doorway of a building or other structure of which such door forms a part.

My invention consists in the combination of a track-rail secured stationary above the door, and provided with a longitudinal rabbet or recess in its under side, rollers mounted on top of said track-rail, and a door suspended from said rollers and having a bearing in the aforesaid rabbet or recess of the track-rail, for the purpose of guiding and steadying the suspended door in its sliding movement.

It also consists in certain peculiar mechanism for facilitating opening and closing the door and securing it closed, as hereinafter described.

Figure 2:
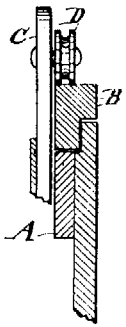
Figure 1:
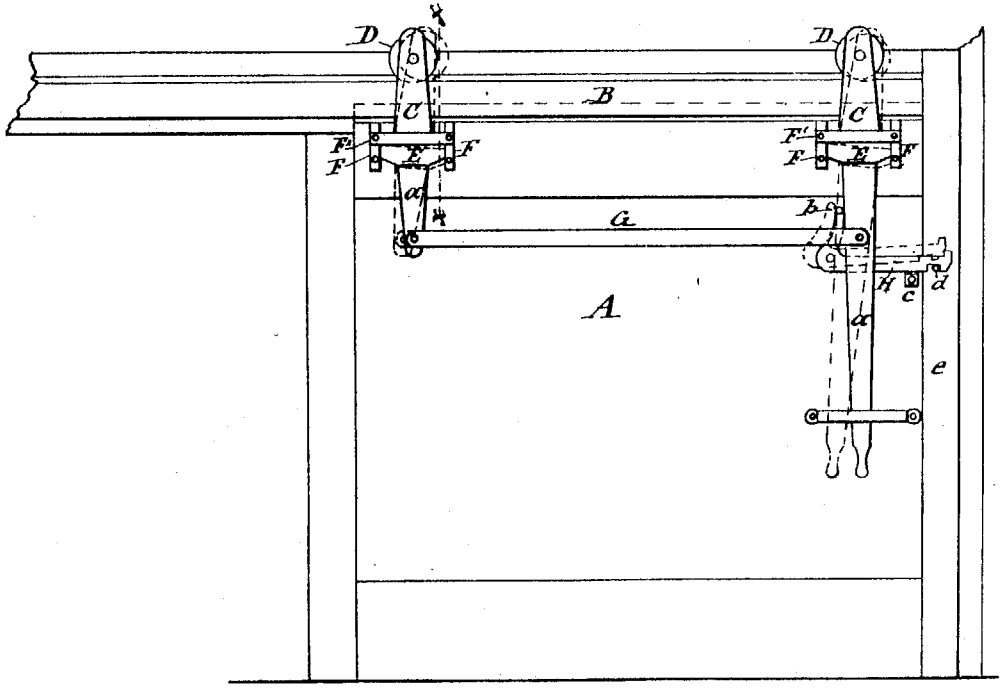

In the accompanying drawings, forming part of this specification, Figure 1 is a front view, showing a door and other parts constructed and combined according to my invention. Fig. 2 is a cross-section on line *x x*, Fig. 1.

Referring to said figures, A represents the suspended sliding door, which may be of the usual form and construction.

C denotes the hanger by which the door is suspended, said hanger being attached to the upper part of the door, and having journaled to its upper extremity a roller, D, which is mounted on the track-rail B, secured above the doorway of a building or other structure. The rail B has in its under side a longitudinal rabbet or recess, into which the upper edge of the door projects, as illustrated in Fig. 2 of the drawings. The bearing of said projection against the side of the recess, in conjunction with the hanger at the opposite side of the rail B, serves to prevent lateral displacement of the door at the top, and to guide and steady the same in its sliding movement.

In order to obviate the difficulty of sliding a door which rests upon a shoe on the floor or runs in a groove or rests on rollers running on a rail laid on the floor, and to better exclude wind and rain or snow when the door is shut, I employ a lever-and-catch mechanism, as shown in the drawings—that is to say, the hangers are extended downward to an unusual length, and each provided with a short cross-piece, E.

Cleats F F are attached to the door and connected by a cross-bar, F′. The space between the latter and the side of the door is sufficient to allow the levers C to be inserted; and when the parts are arranged as shown in full lines, Fig. 1, the cross-pieces E are below, but in contact, or nearly so, with the cross-bars F′.

The extensions or lower portions, *a*, of the lever-hangers are connected by a rod, G. Hence, if the longer or handle arm of that one of the hangers which is adjacent to the front edge of the door A be moved in either direction parallel to the door, the other hanger will obviously be thrown into like oblique position, so that one corner of each of the cross-pieces will be caused to press upward against the cross-bars F′, and since the rollers D constitute practically fixed fulcra of said levers, the door will be raised slightly, so as to slide easily.

In connection with the lever mechanism, I employ the catch H, which is pivoted to the door A behind the first lever, and is provided with a lug or projection, *b*, with which the lever comes in contact, so as to raise the catch and allow the door to be slid back. The free end of the catch rests on a stud, *c*, when the door is being opened or shut, and is thus held in the position required to adapt it to engage with a stud, *d*, fixed in the jamb *e*.

What I claim as new is—

1. The combination of a track-rail secured stationary above the door and provided with a longitudinal rabbet or recess in its under side, rollers mounted on top of said track-rail, and a door suspended from said rollers and having a bearing in the aforesaid rabbet or recess of the track-rail, substantially as and for the purpose specified.

2. The combination, with the sliding door and a supporting top rail, of lever-hangers—that is to say, levers having rollers journaled on their upper ends, their lower portions being connected by a rod—the cross-pieces or ears E, and cross-bars F′, attached to the door, substantially as shown and described, whereby the adjustment of the levers will raise the door and facilitate its sliding movement, as hereinbefore specified.

3. The lever-hangers connected as specified, in combination with the sliding door and top supporting-rail, and the catch H, pivoted to said door, as shown and described, to operate as specified.

4. The arrangement upon a sliding door of two or more levers with rollers, latch, and connections, all operating in such a manner that the door is unlatched, raised, and slid back by the same movement of the longer lever, substantially as set forth.

In testimony whereof I have hereunto signed my name, in the presence of two attesting witnesses, at Los Angeles city, in the county of Los Angeles, in the State of California, this 31st day of January, A. D. 1881.

CHARLES N. EARL.

Witnesses:
H. M. SMITH,
J. E. GRIFFIN.